United States Patent
Rogers

[11] 3,721,474
[45] March 20, 1973

[54] VEHICLE BRAKE CONTROL SYSTEM WITH SAFETY PARKING FEATURE

[75] Inventor: George W. Rogers, Petersburg, Ill.

[73] Assignee: Allis-Chalmers Corporation, Milwaukee, Wis.

[22] Filed: March 27, 1972

[21] Appl. No.: 238,390

[52] U.S. Cl. ........................... 303/9, 303/10, 303/13
[51] Int. Cl. ............................................... B60t 13/04
[58] Field of Search ....................... 303/2, 7, 9, 10, 13

[56] References Cited

UNITED STATES PATENTS

| | | | |
|---|---|---|---|
| 3,241,888 | 3/1966 | Ternet | 303/9 X |
| 3,294,455 | 12/1966 | Valentine | 303/9 |
| 3,617,096 | 11/1971 | Grabb et al. | 303/9 |

Primary Examiner—Allen N. Knowles
Assistant Examiner—Gene A. Church
Attorney—Charles L. Schwab et al.

[57] ABSTRACT

An air compressor and three reservoirs are mounted on the tractor unit, one of which supplies pressure fluid to the tractor brakes, a second of which supplies pressure fluid to control the trailer brake actuators and a third of which supplies pressure fluid to the parking brake release chamber of the tractor brake actuators and to control an emergency braking mechanism which causes the tractor and trailer brake actuators to be applied if the pressure in the third reservoir falls below a predetermined safe value. Pressure fluid for the trailer brake actuators is stored in a fourth reservoir on the trailer and is controlled by a conventional relay valve with an emergency brake application feature. A manually operated emergency and parking brake valve on the tractor is pressure detented in its parking brake released position. When pressure in the third reservoir falls below a predetermined value, the emergency and parking brake valve automatically moves to its exhaust (parking brake applied) position whereby the parking brake release chambers of the tractor brake actuators are exhausted and the emergency braking mechanism is actuated to apply the tractor and trailer brakes.

13 Claims, 3 Drawing Figures

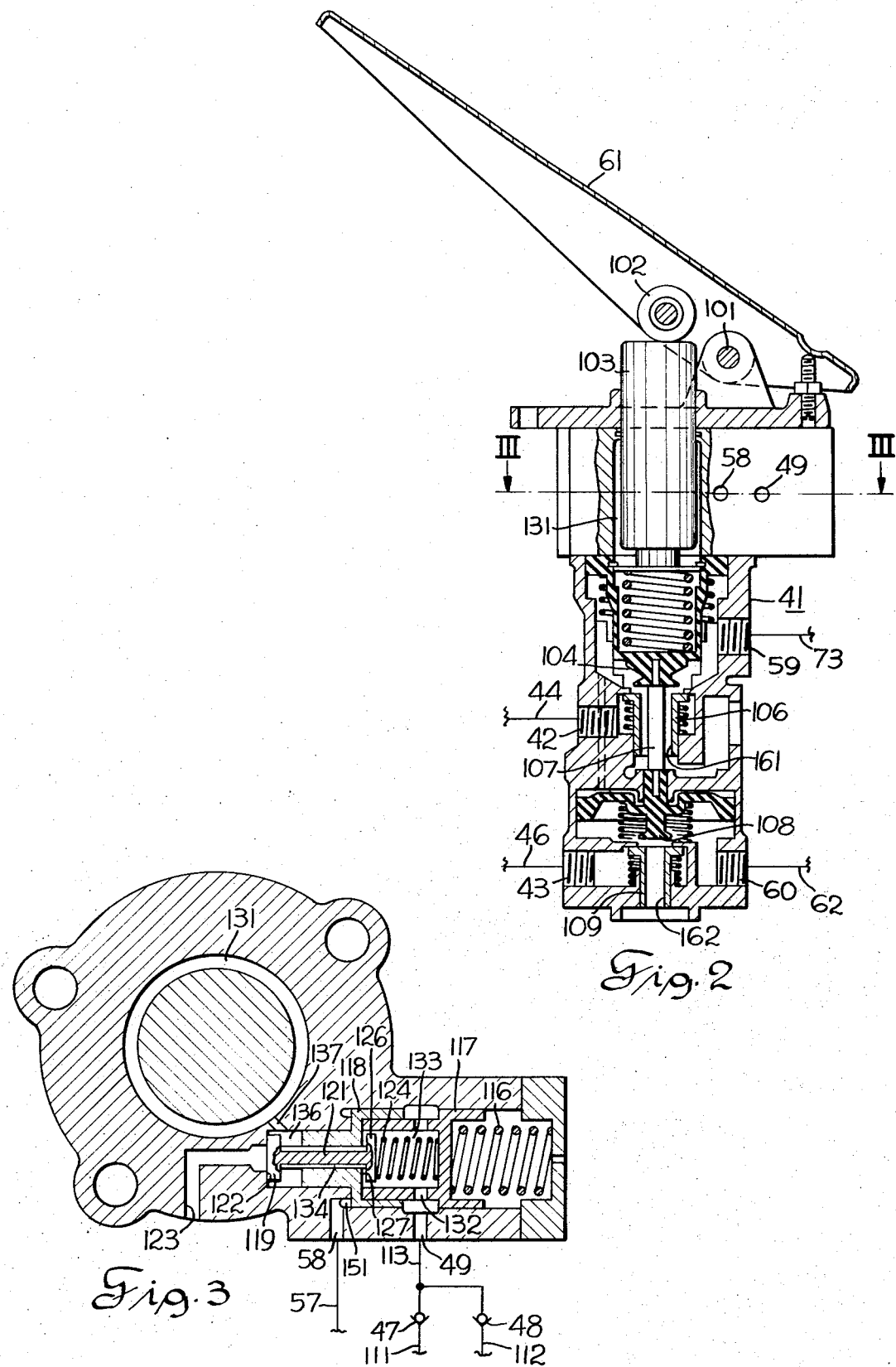

VEHICLE BRAKE CONTROL SYSTEM WITH SAFETY PARKING FEATURE

BACKGROUND OF THE INVENTION

Heretofore various air brake systems have been devised and have enjoyed numerous successful applications in various types of vehicles. However, additional features are considered necessary for some applications, such as in tractor scrapers, particularly in the area of safety features, including automatic emergency braking and parking braking with the parking brake remaining effective even if air pressure deteriorates.

BRIEF DESCRIPTION OF THE INVENTION

The present invention provides a novel emergency and parking brake interrelationship in a tractor-trailer fluid braking system. A spring biased emergency and parking brake valve has a first fluid pressure detented position in which the parking brake release chamber is pressurized to deactivate the brake locking mechanism and in which a balancing pressure is supplied to the emergency braking mechanism to prevent emergency application of the tractor and trailer brakes. When the pressure of the fluid delivered to the manual emergency and parking brake valve drops to 75 percent of normal pressure, a spring overcomes the fluid pressure bias on the fluid control element of the valve and moves it to an exhaust position which results in application of the tractor and trailer brakes and locking of the tractor brakes in their applied condition. The manually operated emergency and parking brake valve may also be moved manually to its exhaust position in which the brake locking mechanism of the tractor brakes is activated and the tractor and trailer brakes are applied. In the event of loss of pressure in the tractor mounted portion of the system the trailer brakes will be automatically applied through pressure available in the trailer reservoir. Should the pressure fail in any one of the three reservoirs on the tractor the lead reservoir 22 would be depleted of air pressure and the tractor or trailer brakes or both will be applied automatically.

BRIEF DESCRIPTION OF THE DRAWINGS

One embodiment of the invention is illustrated in the accompanying drawings in which:

FIG. 2 is a section view of a standard dual brake valve with upper emergency section; and FIG. 3 is a section view taken on line III—III in FIG. 2.

DETAILED DESCRIPTION OF THE INVENTION

Figure 1:
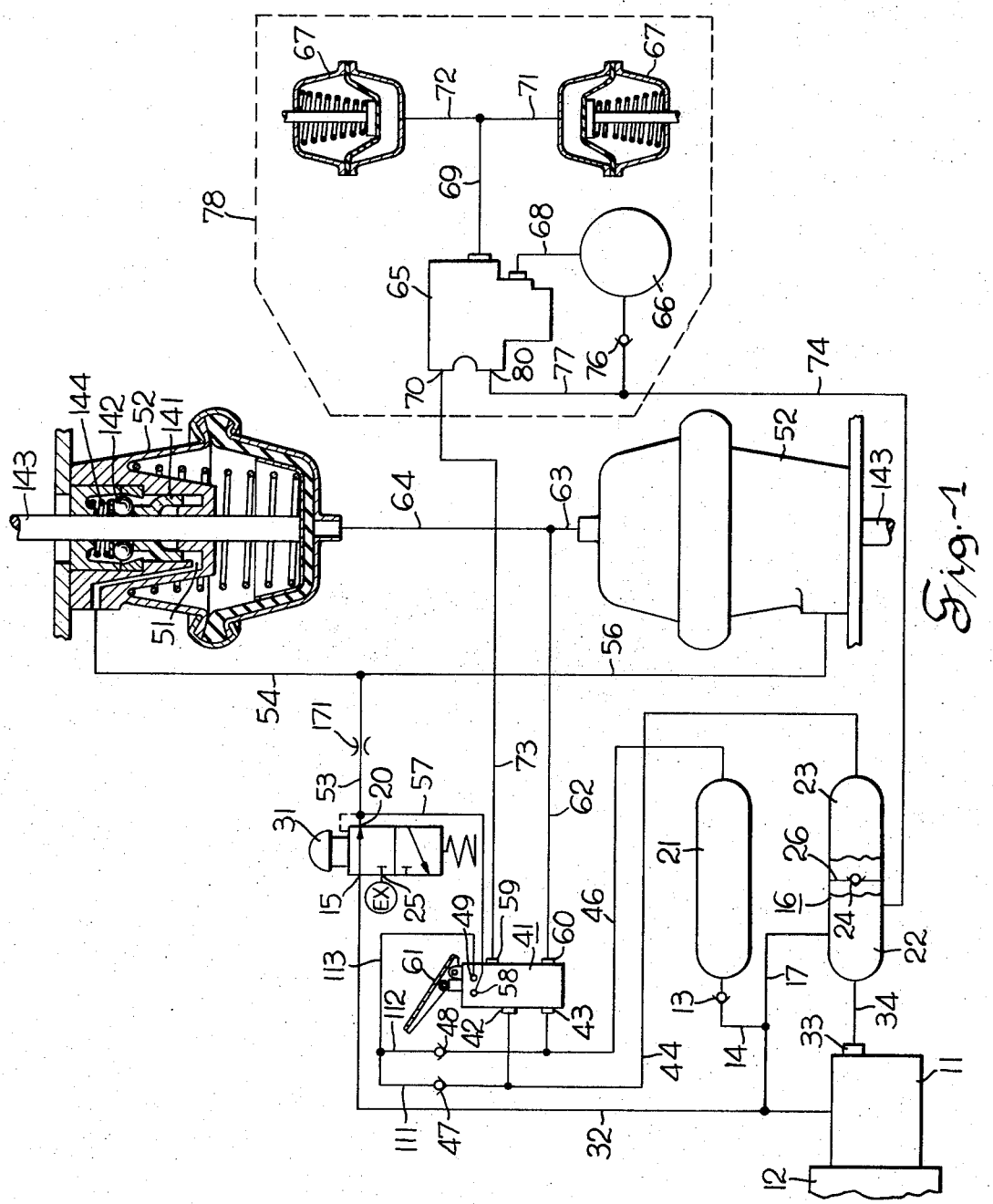
FIG. 1 is a schematic illustration of a tractor-trailer braking system incorporating the present invention.

Referring to FIG. 1, pump means in the form of an air compressor 11, driven by the motive power unit 12 on the tractor, supplies air under pressure to a lead tank or reservoir 21 through a check valve 13 in branch conduit 14 and to a second tank 16 with a branch reservoir 22 connected directly to the compressor through delivery conduit 17 and having a second branch reservoir 23 connected to the reservoir 22 through a check valve 24 in a tank dividing wall 26. Pressurized air is also delivered to a reservoir port 15 of a manually operated emergency and parking brake valve 31 through a conduit 32 connected to the reservoir 22 through delivery of the conduit 17. Air pressure is regulated by a governor 33 on the compressor which is connected to the reservoir 22 by conduit 34. A dual brake treadle valve 41, which is mounted at the operator's station on the tractor, has a pair of reservoir ports 42, 43 connected, respectively, with reservoirs 23 and 21 by conduits 44, 46 which are also connected through check valves 47, 48 in conduits 111, 112 and a conduit 113 with a supply port 49. The manual emergency and parking brake valve 31 has its delivery port 20 connected to parking brake release chambers 51 of a pair of tractor brake actuators 52 by a main conduit 53 and branch conduits 54, 56. A branch conduit 57 is connected to delivery port 20 through its connection with conduit 53 and also connects to a control port 58 in the emergency section of the dual brake valve 41.

Operation of the treadle 61 of treadle valve 41 will connect reservoir 21 with tractor brake actuators 52 via conduit 46, reservoir port 43, delivery port 60, conduit 62 and branch conduits 63, 64 and will pressurize control port 70 of a relay-emergency valve 65 causing the latter to connect a trailer reservoir 66 with trailer brake actuators 67 via conduits 68, 69 and branch conduits 71, 72. The valve 65 is operated by air pressure passing from reservoir 23 through conduit 44, reservoir port 42, delivery port 59, and conduit 73 to control port 70. The trailer reservoir 66 is supplied pressure fluid (compressed air) from reservoir 22 by conduit 74 in which a check valve 76 is operatively interposed. A branch conduit 77 connects conduit 74, and hence reservoir 22, to an emergency segment of the relay-emergency valve 65. When air pressure in reservoir 22, as sensed at emergency port 80, falls below a predetermined value the valve 65 automatically connects the brake actuators 67 to reservoir 66 thus applying the trailer brakes, not shown. The components within dash line 78 are on the trailer of the tractor-trailer vehicle and the other illustrated components are on the tractor portion of the vehicle.

Some components of the illustrated system are conventional, off-the-shelf, items. For instance, the service brake valve 41 is Type DAA Treadle Tandemergency Valve Assembly, without bleed down, sold by Wagner Electric Corporation. The manual emergency and parking brake valve is model PP-2 control valve of Bendix-Westinghouse Automotive Air Brake Company. The relay-emergency valve 65 for the trailer brakes may be of the design shown in FIG. 5 of U.S. Pat. No. 3,115,371. The brake actuators 52 may be of the type shown in FIG. 2 of U.S. Pat. No. 3,205,020 or type SD-3 Safety Actuator sold by Bendix-Westinghouse Automotive Air Brake Company.

Referring to FIG. 2, when the treadle 61 of valve 41 is pivoted down about pivot pin 101, roller 102 forces plunger 103 down thus causing valve element 104 to close exhaust opening 161 and depress seat 106. Interconnecting part 107 causes valve element 108 to close exhaust opening 162 and depress seat 109. Such movement directs pressurized air from conduits 44, 46 to rear and front brake operating conduits 73, 62, respectively.

Referring to FIG. 3, showing auxiliary operating means for the treadle valve 41, reservoirs 21, 23 are connected to supply port 49 via branch conduits 111, 112, check valves 47, 48 and conduit 113. Thus if either reservoir 21 or 23 should lose its pressure the other would deliver pressurized air to supply port 49. Control port 58 is connected to conduit 57 and either to reservoir 22 or to exhaust port 25 depending on the operating position of manual valve 31. As illustrated in FIG. 3, there is no air pressure delivery to control port 58, and a coil spring 116 forces interconnected valve elements 117, 118 to the left as illustrated. In this condition, a disklike part 119 on one end of a small spool 121 seats against seat 122 of exhaust port 123 under the force of small spring 124 and a disklike part 126 on the opposite end of spool 121 is unseated from seat 127 thereby allowing air to be delivered from either or both of reservoirs 21, 23 to an inner emergency pressure chamber 131 via port 49, openings 132, interior cavity 133, grooves 134 in spool 121, chamber 136, and passage 137. Referring also to FIG. 2, the pressurized air delivered to chamber 131 acts on the upper end of valve element 104 forcing the latter and element 108 downwardly to apply the tractor and trailer brakes. In the normal operating condition, air pressure from reservoir 22 delivered to port 49 forces the valve elements 118, 117 to the right against the biasing of spring 116 thus permitting spring 124 to seat the disklike part 126 of spool 121 against seat 127 and displacing the disklike part 119 from seat 122 causing the chamber 131 to be exhausted to atmosphere.

OPERATION

When the vehicle is in normal operation with all reservoirs pressurized, the manual emergency and parking brake valve 31 will have been placed in its down position as illustrated in FIG. 1 wherein the piston 141 of the brake lock mechanism in actuator 52 will hold the balls 142 out of wedged engagement with brake applying rod 143. The treadle valve 41, as illustrated is in its brake release position and thus the brake actuators 52, 67 are in their illustrated nonbraking condition. The pressure supplied by the lead reservoir 22 will pressurize a balancing chamber 151 thereby shifting the elements 118, 117, which are interconnected as by threads not shown, to the right thus opening chamber 131 to atmosphere and seating spool end part 126 on seat 127 to prevent passage of air from reservoirs 21 and 23 to emergency pressure chamber 131.

When the operator depresses the treadle 61 of treadle valve 41, valve elements 104, 108 close off exhaust passages 161, 162 in the seats 106, 109 and unseat the latter to permit pressurized air in reservoir 21 to actuate tractor brake actuators 52 and to permit pressurized air in reservoir 23 to actuate valve 65 which in turn connects the pressurized air in trailer reservoir 66 with trailer brake actuators 67.

If the operator decides to park the vehicle he will depress the treadle 61 to bring the vehicle to a standstill by applying the tractor and trailer brakes and he will pull the emergency and parking brake 31 up to its exhaust position to exhaust the chamber 51 of actuators 52 thereby allowing the spring 144 to move the balls 142 into their wedging position, whereby the rod 143 will be held in an extended brake applying position. On moving the valve 31 to the exhaust position the dual treadle valve will automatically be applied without any requirement for the operator's foot on the treadle 61.

If, in the parking brake applied condition, air pressure in reservoir 21 should be depleted there will be no air delivery to brake actuators 52; however, the locking mechanisms in the actuators 52 will hold the brakes in an applied condition. Air pressure from reservoir 23 will hold the treadle valve in its brake applied condition, through pressurization of chamber 131, and will operate the relay emergency valve 65 to direct pressurized air from trailer reservoir 66 to the trailer brake actuators 67.

If, in the parking brake applied condition, the air pressure in reservoir 23 should be lost, the air pressure in reservoir 21 will keep the treadle valve in its brake applied position and will pressurize the tractor brake actuators 52; however, air pressure will not be available to operate relay-emergency valve 65 on the trailer. Nevertheless the trailer brakes will be maintained in their applied condition because on loss of air pressure in reservoir 23, the air pressure will also be lost in reservoir 22 thus causing the valve 65 to keep the actuators 67 in communication with trailer reservoir 66.

If the operator should place the emergency and parking brake valve 31 in its parking brake apply (exhaust) position without first applying the treadle valve 61 with his foot, built-in restriction means 171 will cause a sufficiently slow exhaust of air from chamber 51 of the brake actuator that the actuators 52 will be pressurized through conduits 62, 63, 64 and the rods 143 extended before the balls 142 are in wedging engagement therewith. This proper sequencing prevents galling of the rods 143 by the balls 142.

When the emergency and parking brake valve 31 is in its normal vehicle operating position, the down position in which it is shown in FIG. 1, and the air pressure in reservoir 22 drops to 75 percent of normal system operating pressure, the spring bias on valve 31 will overcome the fluid (air) pressure bias thereon and the valve 31 will be moved to its exhaust position which causes the tractor and trailer brakes to be applied through automatic operation of treadle valve 41. Loss of air pressure in either reservoir 21 or 23 will bleed the pressure from reservoir 22 and cause the valve 31 to move to its exhaust condition and result in application of both tractor and trailer brakes. Loss of pressure in both reservoir 21 and 23 would result in automatic application of the trailer brakes by relay-emergency valve 65.

A loss of pressure in reservoir 66 will bleed reservoir 22 thereby causing automatic shifting of the emergency and parking brake valve 31 to its exhaust position wherein the tractor brakes will be automatically applied.

From the foregoing it is apparent that this fluid braking system has many desirable safety features for automatically braking the vehicle on loss of air pressure in any one of four different reservoirs. Reservoir 22 is in a lead position whereby it feeds to the other three reservoirs. Thus, should a pressure loss occur in any one of the three independent branch reservoirs 21, 23, 66, to which the lead reservoir 22 is connected by check valves, the lead reservoir 22 will be exhausted but not the other two branch reservoirs. Loss of pressure in the lead reservoir 22 results in automatic application of the vehicle brakes with at least one branch reservoir supplying the fluid pressure for the brake application. The present system achieves desired safety features while keeping the number of conduits passing to the trailer unit to only two. This braking system has application to various tractor-trailer vehicles and is particularly suited to tractor scrapers wherein all lines between the tractor and scraper pass over, under or through a vertical pivot hitch.

The embodiments of the invention in which an exclusive property or privilege is claimed are defined as follows:

1. In a vehicle braking system having first and second fluid operated brake actuators and pump means for supplying fluid under pressure, the combination comprising:
   a lead reservoir connected in fluid receiving relation to said pump means,
   first and second branch reservoirs connected in fluid receiving relationship to said lead reservoir by way of first and second check valves, respectively,
   a dual brake valve having a pair of independent reservoir ports connected in fluid receiving relation, respectively, to said first and second branch reservoirs and a pair of independent delivery ports operatively associated with said first and second brake actuators, respectively,
   a spring biased and fluid pressure released locking mechanism in said first brake actuator including a pressure chamber and a piston in said pressure chamber,
   a fluid conduit connected to said pressure chamber,
   a manually operable, spring biased and fluid pressure detented emergency and parking brake valve connected in fluid receiving relation to said lead reservoir and connected in fluid delivery relation to said fluid conduit,
   emergency actuating means operatively associated with said dual brake valve including
      an emergency pressure chamber, and
      valve means controlling fluid to and from said emergency pressure chamber having a supply port, a control port and an exhaust port and including a shiftable flow control means having a first position in which said emergency pressure chamber is connected to said exhaust port and a second position in which said pressure chamber is connected to said supply port,
   means connecting said first branch reservoir in fluid delivery relationship to said supply port including a check valve,
   means connecting said second branch reservoir in fluid delivery relation to said supply port including a check valve,
   spring means biasing said flow control means to said second position,
   a balancing chamber operatively associated with said flow control means, whereby the latter is shifted to said first position when said balancing chamber is subjected to a predetermined fluid pressure, and
   passage means connecting said control port to said fluid conduit.

2. The invention of claim 1 and further comprising a third branch reservoir connected in fluid receiving relation to said lead reservoir by way of a third check valve and a relay-emergency valve connected to said third reservoir, said second brake actuator, one of said delivery ports of said dual brake valve and said lead reservoir, said relay-emergency valve connecting said third branch reservoir to said second brake actuator when pressure fluid is delivered to said one delivery port of said dual brake valve and when the pressure in said lead reservoir falls below a predetermined pressure.

3. The invention of claim 2 wherein said second brake actuator, said third branch reservoir, and third check valve, and said relay-emergency valve are on a trailer portion of said vehicle.

4. The invention of claim 1 and further comprising fluid flow restricting means restricting flow from said pressure chamber sufficiently to delay locking operation of said locking mechanism until said first brake actuator has substantially assumed its brake applied condition.

5. In an air brake system including an air compressor, the combination comprising:
   a first air operated brake actuator with spring applied and air pressure released locking mechanism,
   a second air operated brake actuator,
   a lead reservoir connected in compressed air receiving relationship to said compressor,
   first and second branch reservoirs,
   means connecting said lead reservoir in air delivery relationship to said branch reservoirs including a pair of check valves between said lead reservoir and said branch reservoirs, respectively, whereby said branch reservoirs are isolated from one another,
   manually operated dual brake valve means connected in fluid receiving relationship with said branch reservoirs and operatively associated with said brake actuators,
   a manually operable emergency and parking brake valve,
   a first conduit interconnecting said lead reservoir and said valve,
   a second conduit interconnecting said valve and said locking mechanism of said first brake actuator,
   said valve being spring biased to a first position in which said second conduit is connected to atmosphere and having a second position to which manually moved and detented by pressurized air from said lead reservoir wherein said first conduit is connected to said second conduit, said valve moving from said second position to said first position, upon said pressure in said lead tank falling below a predetermined value, and
   auxiliary operating means for said manually operated valve means connected in air receiving relationship to said branch reservoirs and in controlled relationship to said second conduit whereby said valve means is operated to cause actuation of said brake actuators whenever the air pressure in said second conduit falls below a predetermined value.

6. The invention of claim 5 and further comprising means downstream of the connection between said second conduit and said auxiliary operating means operative to restrict exhaust air flow from said locking mechanism sufficiently to allow said first brake actuator to be applied before said locking mechanism is in its locking condition.

7. The invention of claim 5 and further comprising a third branch reservoir, conduit means connecting the lead reservoir in air delivery relationship to said third branch reservoir, a one way valve in said conduit means and a relay valve connected in air receiving relationship to said third branch reservoir, in air delivery relationship to said second brake actuator and in controlled relationship to said dual brake valve means.

8. The invention of claim 7 wherein said relay valve is connected to said conduit means upstream of said one way valve and includes means causing said third branch reservoir to be connected in air delivery relationship to said second brake actuator upon the pressure in said lead reservoir falling below a predetermined pressure.

9. The invention of claim 8 wherein said brake system is in a vehicle having a tractor and trailer and wherein said second brake actuator, relay valve, one way valve, and third branch reservoir are on said trailer and said compressor, first brake actuator, lead reservoir, first and second branch reservoirs, dual brake valve, emergency and parking brake valve and auxiliary operating means are on said tractor.

10. The invention of claim 9 and further comprising means downstream of the connection between said second conduit and said auxiliary operating means operative to restrict exhaust air flow from said locking mechanism sufficiently to allow said first brake actuator to be applied before said locking mechanism is in its locking condition.

11. In an air brake system including an air compressor, the combination comprising:
a brake actuator with spring applied and air pressure released locking mechanism,
a first air reservoir connected in compressed air receiving relation to said compressor,
a second air reservoir,
means connecting said second air reservoir to said first reservoir including a check valve permitting flow of air from said first reservoir to said second reservoir and preventing flow from said second reservoir to said first reservoir,
a manually operated service brake valve connected in air receiving relationship to said second reservoir and in air delivering relationship to said brake actuator,
a manually operated emergency and parking brake valve having a reservoir port, a delivery port and an exhaust port,
first conduit means connecting said first reservoir with said reservoir port,
second conduit means connecting said delivery port with said locking mechanism,
said emergency and parking brake valve being spring biased to an exhaust position wherein said reservoir port is blocked and said delivery port is connected to said exhaust port,
said emergency and parking brake valve being manually shiftable to an air delivery position wherein it is air pressure detented and wherein said reservoir port is connected to said delivery port and said exhaust port is blocked,
means for effective emergency operation of said service brake valve including air pressure operated actuating means and automatic valve means connected to said second reservoir and to said delivery port of said emergency and parking brake valve, said automatic valve means exhausting said air pressure operated actuating means when the pressure of air at said delivery port exceeds a predetermined value and connecting said air pressure operated actuating means to said second reservoir to effect operation of said service brake valve when the air pressure at said delivery port falls below a predetermined value.

12. The invention of claim 11 and further comprising means operative to restrict exhaust air flow from said locking mechanism sufficiently to allow said brake actuator to be applied before said locking mechanism is in its locking condition.

13. The invention of claim 12 wherein said emergency and parking brake valve automatically shifts from its air pressure detented delivery position to its exhaust position upon the air pressure in said first reservoir falling below a predetermined value.

* * * * *